United States Patent [19]

Anderson

[11] Patent Number: 5,001,682
[45] Date of Patent: Mar. 19, 1991

[54] METHOD AND APPARATUS FOR DETECTING SEISMIC EVENTS

[76] Inventor: Weston A. Anderson, 763 La Para Ave., Palo Alto, Calif. 94306

[21] Appl. No.: 523,336

[22] Filed: May 14, 1990

[51] Int. Cl.$^5$ .............................................. H04R 15/00
[52] U.S. Cl. .................................... 367/186; 181/122; 73/649; 33/1 HH; 33/398
[58] Field of Search ................ 181/122; 367/178, 179, 367/182, 184–186, 188; 340/688–690; 73/649–652; 324/125, 147, 150, 154 PB; 33/365, 384, 391, 398, 1 HH

[56] References Cited

U.S. PATENT DOCUMENTS

| | | | |
|---|---|---|---|
| 2,272,984 | 2/1942 | Ritzmann | 367/182 |
| 3,026,428 | 3/1962 | French | 367/182 |
| 3,181,065 | 2/1965 | Bajars | 324/150 |

OTHER PUBLICATIONS

Markus Bath, "Introduction to Seismology", 2nd Ed., 1979 published by Birkhauser Verlag, Vasel, Boston, Stuttgart, Chapter 2, Seismographs, pp. 29–60.

*Primary Examiner*—Brian Steinberger

[57] ABSTRACT

A seismographic sensor is constructed from a D'Arsonval movement. The elements of the movement include a coil suspended in the field of a permanent magnet and a pointer attached to the coil. A weight is attached to the pointer and acts as an inertia element. Leveling screws are provided to control the period of the weighted pointer and to control the resting position of the pointer. When the base of the meter vibrates during an earthquake, the weighted pointer does not follow the vibration because of its inertia, resulting in a relative rotation of the meter coil and the magnet field, thereby inducing a voltage in the coil. This voltage is proportional to one component of horizontal velocity of the earth's motion. Means are provided to process and record the magnitude of this voltage.

11 Claims, 1 Drawing Sheet

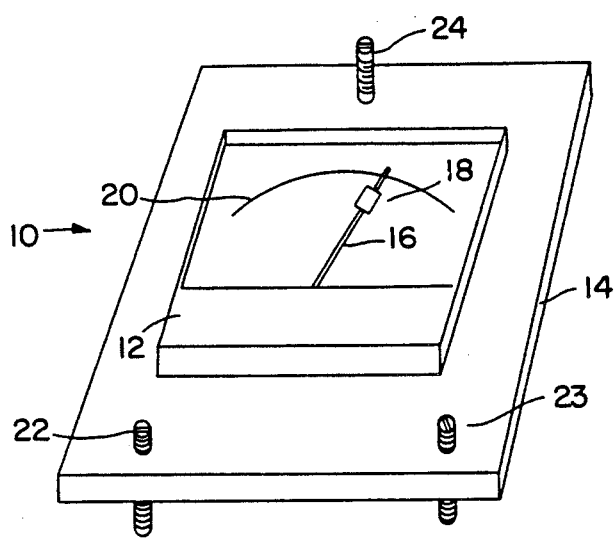
FIG. I
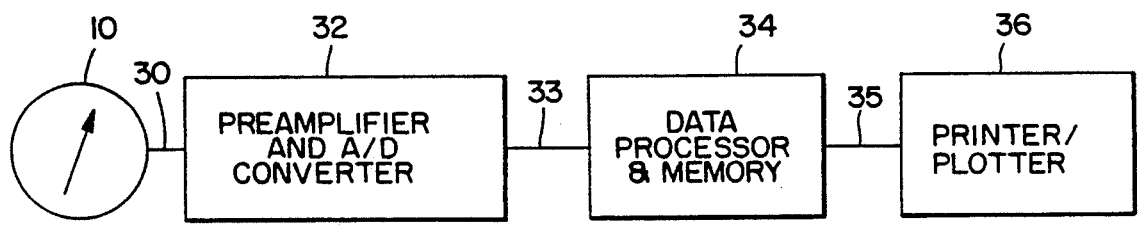
FIG. 2
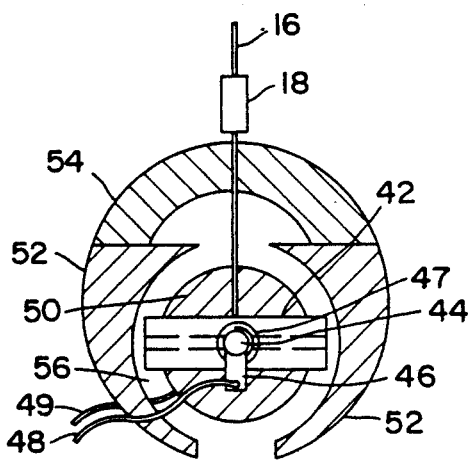
FIG. 3
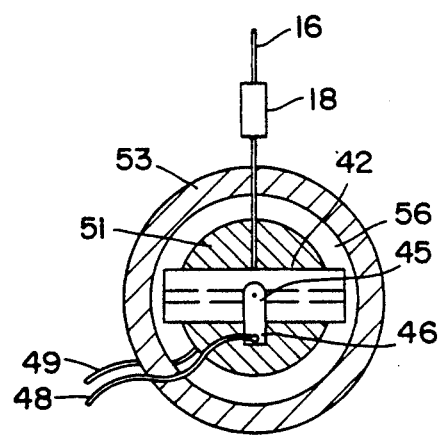
FIG. 4

METHOD AND APPARATUS FOR DETECTING SEISMIC EVENTS

BACKGROUND OF THE INVENTION

Seismic detectors are used to detect earth motion caused by natural phenomena such as earthquakes, microseisms and landslides and man made phenomena such as chemical or nuclear explosions. A seismograph is a complete instrument for detecting and recording earth motions and consists of a seismic detector, and a recording means including a chronograph for indicating the time of any detected motion.

Most seismic detectors, including the instant invention, rely on the inertia of a mass which is relatively free to move in at least one direction relative to the ground. As the ground moves during an earthquake the restoring force on the mass is sufficiently weak so it does not follow the earth's motions, and a sensing means can measure the relative motion of the earth and the mass. Mechanical seismographs couple this relative motion directly to drive a pen which writes upon a revolving drum to record the earth motion. Opto-mechanical seismographs use a light beam reflected from a mirror coupled to the stationary weight to directly record the motion upon photographic medium attached to a revolving drum. Electromechanical types, e.g. the Galitzin, uses a coil attached to the mass and a permanent magnet attached to a frame fixed to the earth. During the earthquake the magnet moves within the coil thereby inducing a voltage within the coil. This voltage can then drive a galvanometer or other recording means. The Galitzin sensor mentioned above uses the linear motion of the coil and the magnet or magnetic circuit to cause a change in the flux through the coil. Other sensors use other electrical and physical properties of materials to detect the relative motion of the inertial mass and the earth. One advantage of electromechanical types of seismic detectors is that the voltage they produced can be processed by modern electronic circuits including computers thereby amplifying, filtering, calibrating, storing and displaying the signals. In addition the signals from a number of sensors can be compared and analyzed to provide additional information about the source of the earth's motion.

SUMMARY OF THE INVENTION

In the instant invention an electromechanical movement of the D'Arsonval type is used to detect the motion. In this movement the coil undergoes a purely rotary motion about its center. A magnetic field produced by a permanent magnet fixed to the base causes a change of magnetic flux through the coil as it rotates. The coil is supported by a pair of low friction pivots or a taut metal band constraining its motion to a pure rotation. A pointer fixed to the coil provides a useful visual detector of the coil movement. I have discovered that by placing a small mass on the pointer that the movement can be employed as a very sensitive detector of relative movement of the magnet. I have also discovered that the standard microampere D'Arsonval type meter can be modified to the form required for this invention. Specifically, a small weight (mass) is suspended upon the pointer of a standard micro-ampere meter of the D'Arsonval type. The mass and position of the weight can be used to adjust the characteristics of the sensor. If the weight is placed at the far end of a long pointer the sensor will provide a linear response for larger earth motions. The sensor maintains its linearity for motions up to distances that approximately equal the distance the center of mass on the coil-pointer-weight system is from the pivot. Placing the weight closer to the coil will increase the sensitivity which may be desirable for the study of microseisms. The meter is fixed to a base plate which is supported by three legs upon a platform fixed to the earth. At least two of the legs are adjustable in length permitting the meter assembly to be leveled or tilted with respect to the earth's horizontal plane. The legs may consist of threaded rods which fit into tapped holes in the base plate. By rotating the screws, the degree of tilt of the base plate can be controlled. By controlling the tilt, one can control the period of the pointer motion and its equilibrium position.

Any motion of the earth that is perpendicular to the pointer results in a relative rotation of the pointer and coil with respect to earth. This relative motion induces a voltage into the coil. The coil of a D'Arsonval meter or galvanometer is suspended so that it is centered about a soft iron core fixed to the meter base. A permanent magnet fixed to the meter base generates a magnetic flux which is guided to pole pieces which partially surrounds the moving coil. This arrangement provides a very uniform magnetic flux density so that as the coil rotates with respect to the meter base a voltage is generated in the coil which is a rather precise measure of the angular rotational velocity difference between the coil and base. To the extent pointer restoring force is small so the mass does not move while the earth undergoes a horizontal vibration perpendicular to the pointer direction, a voltage is produced that is proportional to the velocity of this motion. By using two sensors with their pointers perpendicular to each other one obtains sufficient information to determine the direction of all the horizontal components of the earth's motion. The advantage of my invention is that it is a simple construction and low cost. I can make use of a conventional microampere meter which is a standard item of commerce. The additional elements of the inventive sensor such as the small weight or mass fixed to the pointer and the base with leveling screws are simple, resulting in a low cost, efficient and sensitive seismic sensor. The electrical output can be suitably amplified, digitized, processed and stored and/or displayed.

BRIEF DESCRIPTION OF THE DRAWINGS

FIG. 1 is a three dimensional depiction of the seismic meter sensor.

FIG. 2 is a block diagram of the apparatus used to amplify, digitize, process, and store and/or display the electrical output signals from the seismic sensor.

FIG. 3 is a schematic diagram of the internal construction of the sensor of this invention.

FIG. 4 is a schematic diagram of the internal construction of an alternative sensor.

DETAILED DESCRIPTION OF THE INVENTION

The main elements of the preferred embodiment of the seismic sensor system 10 is illustrated pictorially in FIG. 1. Here a sensitive D'Arsonval type meter movement 12 is mounted on base plate 14. For example meter 12 may be a 25–0–25 microampere meter. Typically the full-scale sensitivity of the meter would be +/− 10 to 100 microamperes, however less sensitive meters would be suitable as strong motion detectors. The meter may either be a jeweled movement or a taut band movement, the taut band movement being preferred. The pointer 16 of meter 12 has a small weight 18 fixed to it. This weight typically has a mass of 0.1 to 2 grams. It must not be so heavy to bend pointer 16 to sufficiently to cause weight 18 to drag or rest upon the scale 20 below it. Leveling screws 22, 23, and 24 are threaded and screwed into tapped holes in base plate 14. The bottom end of the three screws rests on a platform (not explicitly shown) which is resting upon the earth. It would also be possible to employ a pointer which has the appropriate mass distributed along its length rather than a single lumped mass. This would provide a stronger arm and make the device somewhat more rugged.

The seismic sensor system 10 measures horizontal movements of the earth that are perpendicular to the direction of the pointer 16. The system 10 can be oriented and placed on its resting platform so that the pointer, when centered, will be perpendicular to the direction of the motion component to be detected. The base plate 14 is initially leveled to control the centering, period and damping of the pointer. By adjusting screws 22 and 23 the pointer can be adjusted so that it will rest at the center of the scale (which corresponds to 0 for a center reading meter). Next the period and damping are adjusted with screw 24. When the end of the base plate 14 near screw 24 is low, the pointer will swing freely with a relatively short period. As screw 24 is advanced to raise that end of base plate 14, the period of the pointer will increase and the damping due to the friction in the system will become more pronounced, causing the pointer to undergo fewer oscillations before it comes to rest. As the screw 24 is advanced further a point can be found that after the pointer is perturbed, it will just return to its resting position without any overshoot. This is the point of critical damping and normally provides the optimum adjustment of the leveling screws. If the screw 24 is advanced still further, the pointer becomes unstable and swings to one side or the other. The electrical output connections of sensor system 10 are on the back side of meter 12 and are not shown in FIG. 1.

Now refer to FIG. 2. In this Figure single lines 30, 33, and 35 represent two or more electrical connections between the components. The electrical output 30 of sensor system 10 is connected to the input of a preamplifier and A/D (Analog to Digital) converter.

The preamplifier gain can be adjusted to control the sensitivity and thus the range of motion that can be detected and recorded. For the detection of distant seismic events the gain is typically set so the output of the A/D converter fluctuates a few bits due to the natural microseismic motions of the earth. A lower gain setting might be used when only strong motion sensing is desired. It has been found that when using a 10 microampere meter, microseisms typically produce a sensor output signal from about a fraction of a microvolt to several microvolts. The microseism level of course will depend upon the location and weather conditions. The number of output bits of the A/D converter and the number of bits that are saved or recorded determines the dynamic range of the instrument. Eight to sixteen output bit A/D converters are typical. The dynamic range can also be extended by using a non-linear amplifier between the preamplifier and the A/D converter.

The output of the A/D converter is sent to the Data Processor and Memory unit 34. A personal computer makes an excellent data processing and memory unit.

The signal from the A/D converter carried on cable 33 may either be in serial or parallel from and transmitted through a standard bus such as the standard RS-232 or 488 bus. The Data Processing and Memory unit 34 contains a digital memory, a central processing unit (CPU), a stored program, a timing or clock means, and an output means. As the digital data is received on cable 33, it is stored in memory so that the most recent data is available at all times. Time information is also stored in the memory along with the corresponding seismic data. The length of time the data is stored depends upon the amount of memory allocated for storage and may range from a few minutes to several hours or even days. A seismic event detection is also preformed by the Data Processor and Memory unit 34. This may take one of many different forms. It has been found that a reliable event detection can be achieved by calculating the short term RMS (root-mean-square) signal amplitude and comparing it to the RMS signal amplitude that has been obtained by averaging over a longer time period. An event indicator is triggered if the ratio of the short term average to long term average is greater than a preset factor (typically 2 to 4). When the event indicator is triggered the stored data that occurred before the event and the data occurring during and for a certain time period after the event is transferred along with the time information to a more permanent form of storage. This more permanent storage media may be a magnetic or optical disk storage medium, or the signals may be transferred to a printer or plotter 36 via cable 35. In this way only data related to seismic events are recorded, resulting in a large savings in storage media.

FIG. 3 is a description of the internal construction of the meter movement. A rectangular coil 42 is supported by two jeweled bearings, the top bearing 44 and a similar bearing on the other side of coil 42. The bearings are fixed rigidly to the case through support member 46. Pivots attached to the coil 42 fit into the bearings permitting the coil to freely rotate about the axis defined by the pivots. Fine electrical wires 47, connect the meter coil to support member 46 and a to similar support member below (not shown). Electrical conductors 48 and 49 carry the currents from the support members of the meter sensor to the preamplifier and are represented by cable 30 of FIG. 2. The right and left sides of coil 42 traverse a magnetic field produced by permanent magnet 54. The field is guided by the soft iron pole shoes 52 and core 50 to produce a uniform field in the gap region 56 occupied by the sides of coil 42.

Pointer 16 is attached to coil 42 and weight 18 is attached to pointer 16. A sudden horizontal movement of the complete sensor with a vector component perpendicular to the arm 16 will induce a rotation of coil 42 and will induce a voltage in the coil as it cuts the magnetic flux lines in gap 56.

A number of variations in the configuration of the meter sensor may occur without changing the basic operation of the sensor system shown in FIG. 3. In FIG. 4 another embodiment of the meter movement is shown in which the permanent magnet 51 is in the form of a cylinder and replaces the soft iron core 50. In this case the pole shoe 53 form a continuous path about the periphery of gap 56 as shown in FIG. 4. Instead of the bearings 44 of FIG. 3, taut metal bands supports coil 42. One band extends from coil 42 to support 46 where it is attached at the point 45. The other band similarly extends from the coil 42 to a lower support (not shown). The bands not only serve to support coil 42 but also serve to connect the wires of coil 42 to the upper metal support 46 and the lower metal support (not shown). Electrical wires 48 and 49 carry the signal currents from the meter sensor to the Preamplifier 32 of FIG. 2.

I claim:

1. Apparatus for detecting a seismic event comprising:
    (a) a platform,
    (b) a permanent magnet and a soft-iron core supported by said platform, said soft iron core mounted between the poles of said permanent magnet;
    (c) a coil supported by said platform and means for suspending said coil for rotation about said stationary soft-iron core;
    (d) a pointer arm attached to said coil, said pointer arm being positioned to be substantially parallel to said platform and to rotate along with said coil;
    (e) said pointer arm being weighted to provide inertia to said coil;
    (f) leveling means for controlling the tilt of said platform with respect to the surface of the earth;
    (g) electrically conductive connections to said suspended coil for transmitting voltage induced into said coil to an amplifying and recording means.

2. The apparatus according to claim 1 wherein said means for suspending said coil comprises jeweled pivot bearings fixed to said platform.

3. The apparatus according to claim 1 wherein said means for suspending said coil comprises two collinear taut metal bands supporting said coil.

4. The apparatus of claim 1 wherein said arm is weighted by means of a lumped mass attached to the arm at a predetermined distance from said coil.

5. Apparatus for detecting a seismic event comprising:
    a. a sensitive D'Arsonval electrical meter movement comprising a coil suspended in a magnetic field and a pointer arm attached to said coil;
    b. a weight, said weight attached to said pointer at a distance from said coil;
    c. leveling means for controlling the position, period, and centering of said pointer and weight system;
    d. electrical terminal means connected to said suspended coil for conducting any voltages induced into said coil to an electrical signal processor.

6. The apparatus according to claim 5 wherein said coil is suspended by two jeweled pivot bearings.

7. The apparatus according to claim 5 wherein said coil is suspended by two collinear taut metal bands.

8. The apparatus according to claim 5 wherein said electrical meter movement is a microampere meter with a full scale sensitivity between 10 and 1000 microamperes.

9. The apparatus of claim 5 wherein said microampere meter has its zero at the center of the scale.

10. The apparatus according to claim 7 wherein electrical connections to said suspended coil are made through said two collinear taut metal bands.

11. A new method of using a D'Arsonval type microampere meter having a pointer and a coil to detect earth movements including the steps of:
    (a) applying a weight to the said pointer of said D'Arsonval type microampere meter;
    (b) leveling and adjusting the said pointer to be substantially perpendicular to the earth's gravitational vector;
    (c) processing voltages that are induced, in operation, into the said coil of said D'Arsonval type microampere meter as indicative of relative movement of said pointer with respect to the earth.

* * * * *